United States Patent
Jobe et al.

(10) Patent No.: US 7,647,938 B2
(45) Date of Patent: Jan. 19, 2010

(54) READILY DEMOUNTABLE FILL VALVE

(75) Inventors: David Jobe, Matamata (NZ); Robin Jobe, Matamata (NZ)

(73) Assignee: Jobe Holdings Limited, Matamata (NZ)

( * ) Notice: Subject to any disclaimer, the term of this patent is extended or adjusted under 35 U.S.C. 154(b) by 639 days.

(21) Appl. No.: 11/259,359

(22) Filed: Oct. 26, 2005

(65) Prior Publication Data

US 2006/0124878 A1 Jun. 15, 2006

(30) Foreign Application Priority Data

Oct. 26, 2004 (NZ) .................................. 536133

(51) Int. Cl.
*F16K 33/00* (2006.01)
*F16K 31/18* (2006.01)

(52) U.S. Cl. .................. 137/15.26; 251/46; 251/61.2; 251/337; 251/331; 137/443; 137/414

(58) Field of Classification Search .................. 251/49, 251/11, 61.2, 331, 335.2, 43, 46, 337, 45, 251/35; 137/409, 434, 15.26, 414, 413, 443, 137/442, 411, 315.05, 315.08, 315.27, 15.19
See application file for complete search history.

(56) References Cited

U.S. PATENT DOCUMENTS

| | | | | |
|---|---|---|---|---|
| 3,429,321 A | * | 2/1969 | Thrall | 137/77 |
| 3,971,405 A | * | 7/1976 | Millar et al. | 137/461 |
| 3,982,557 A | | 9/1976 | Acevedo et al. | |
| 4,240,606 A | | 12/1980 | Johnson | |
| 4,488,702 A | * | 12/1984 | Lapeyre | 251/46 |
| 4,632,142 A | * | 12/1986 | Shames et al. | 137/437 |
| 5,282,280 A | * | 2/1994 | Wodeslavsky | 4/366 |
| 5,652,970 A | * | 8/1997 | Wodeslavsky | 4/378 |
| 5,842,498 A | | 12/1998 | Locke et al. | |
| 6,595,236 B2 | * | 7/2003 | Herlihy | 137/414 |

FOREIGN PATENT DOCUMENTS

NZ 328862 9/2001

* cited by examiner

*Primary Examiner*—Stephen Hepperle
*Assistant Examiner*—Andrew J Rost
(74) *Attorney, Agent, or Firm*—Knobbe Martens Olson & Bear LLP

(57) ABSTRACT

A fill valve assembly for controlling liquid flow into a reservoir includes a mounting adapter defining a liquid inlet passage for connection to a riser for supplying water to the valve and which renders the fill valve readily mountable and demountable for installation and maintenance. A valve body has liquid inlet and outlet openings and a pressure-responsive member is disposed within the valve body and defines a control chamber with which the liquid inlet passage communicates opposite a second side of the pressure responsive member also in communication with the liquid inlet for selectively opening and closing the inlet opening to liquid flow in response to liquid pressure in the control chamber. A biasing means acts on the pressure-responsive member together with pressure in the control chamber, against the inlet pressure acting on the opposite side of the pressure-responsive member, to hold a valve surface fixed to the pressure-responsive member against a valve seating face ion the adaptor so as to close the inlet opening to liquid flow. The valve body, pressure-responsive member and biasing means are arranged to be demountable from the adaptor as a unit in a manner so as to provide ready access to the mating valve surface and valve seating face e.g. for cleaning.

8 Claims, 4 Drawing Sheets

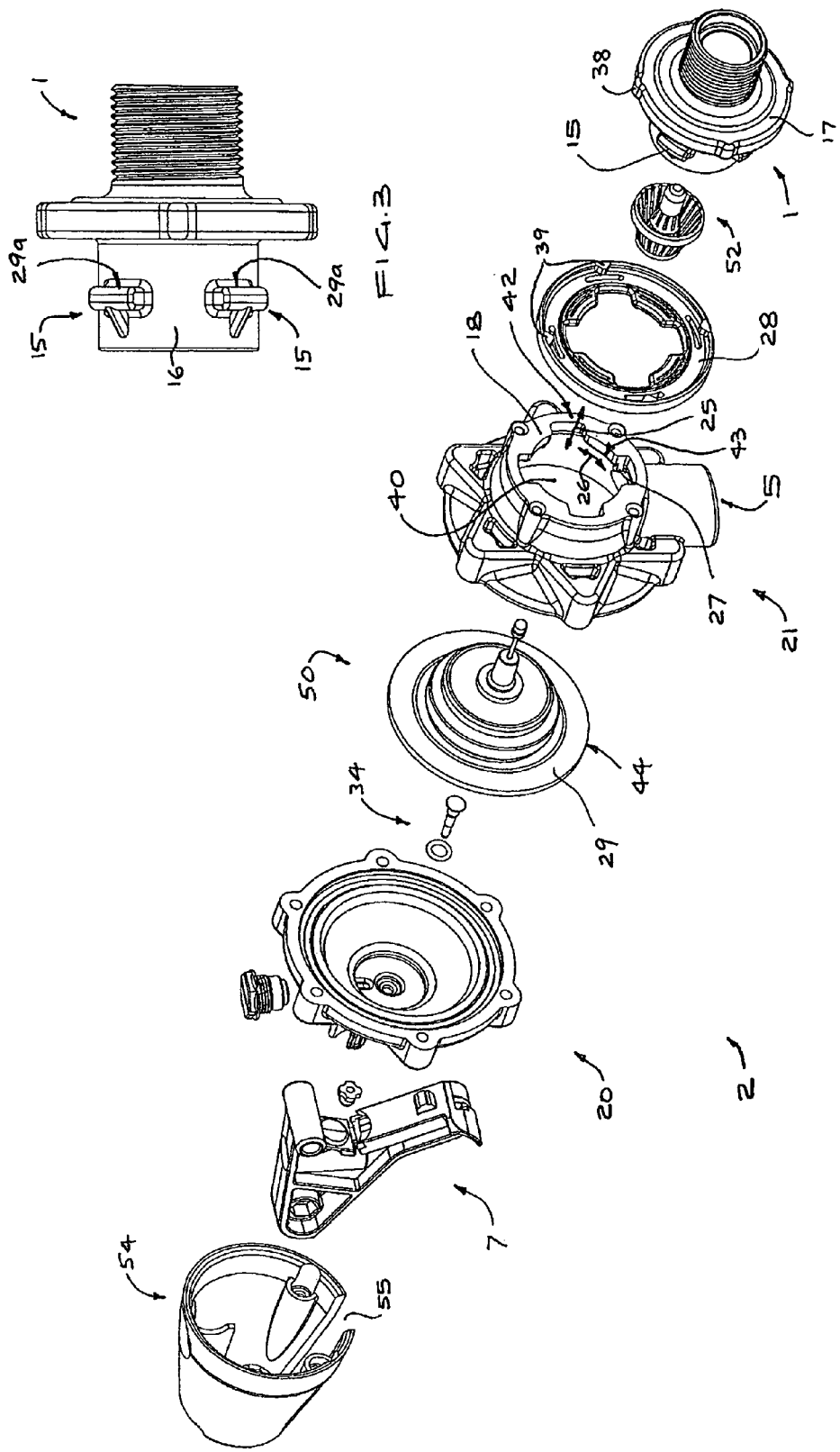

US 7,647,938 B2

READILY DEMOUNTABLE FILL VALVE

BACKGROUND

1. Field

The present invention relates to fill valves for controlling liquid level in a reservoir. More particularly the invention relates to fill valves having adaptors by which they may be simply and quickly mounted and demounted to allow for simplified installation and maintenance.

2. Description of Related Art

Fill valves function to maintain a predetermined liquid level in a reservoir, and are used widely in livestock watering troughs and toilet tanks. A typical fill valve includes an inlet adapted to be connected to a liquid supply, an outlet communicating with the reservoir, a valve for controlling flow from the inlet to the outlet, a device for detecting the level of liquid in the reservoir (such as a float or diaphragm responsive to water pressure), and means actuated by the detecting device for opening the valve when the liquid level is below a predetermined level.

In fill valves, the region including the valve seal and mating valve seating face can become fouled by dirt or debris in the water supply and it may be necessary to remove and disassemble the fill valve to clean this region. It is therefore desirable that the valve can be readily mounted and demounted and allows for good access for cleaning and maintenance.

The applicant's own prior art float-controlled fill valve has a main valve disc fixed to a diaphragm, the valve disc engaging an inlet valve seat to stop water passing from the inlet to the outlet. Opposing the inlet side of the diaphragm, a control chamber is connected by a port to the inlet side, such that when in this closed position, static water pressure acting on both sides of the diaphragm is the same. A spring biases the valve disc against the inlet valve seat to hold the valve closed. When the float falls, a pivoting arm connected thereto opens a pilot valve which vents the control chamber, such that the pressure on the inlet side overcomes the spring bias and opens the valve. The fill valve is formed from main two components, a cover (housing the pivoting arm and pilot valve) and a base (in which the inlet and outlet are provided). The diaphragm and spring are held between the base and the cover and the inlet is a protruding connector formed integrally with of the base.

Before this valve can be removed for cleaning it is necessary to turn off the water supply and disconnect and remove the hardware which mounts the valve to the reservoir. Even if the fill valve can be cleaned or repaired while mounted on the reservoir and still attached to the hardware connecting it, access to the valve and valve seat is difficult and requires the necessary tools to remove the base. When the fill valve is mounted below the water level of the reservoir, the protruding adaptor is passed through the reservoir wall and held in place with a sealing gasket and screw fitting and in such a case it is also necessary to drain the reservoir.

U.S. Pat. No. 5,842,498 describes a fill valve (with a diaphragm responsive to water pressure) mounted by the push-twist action of a bayonet joint. Water is supplied to the valve through a central passage in an adaptor which includes the female part of the bayonet joint, the male part with radially projecting tabs being formed on the valve body. The end of the passage in the adaptor is surrounded by O-rings which seal against an annular face provided on the male part.

Although the bayonet joint between the valve and the adaptor renders the valve readily mountable and dismountable, it does not avoid the difficulties of accessibility, particularly to the diaphragm of the valve and the mating sealing surfaces controlling operation of the valve itself. The need remains for the repairer to have the necessary skill and tools to disassemble the valve once it has been removed in order to access these mating sealing surfaces.

NZ Patent No. 328 862 discloses a float-controlled fill valve where the diaphragm and spring are held between a base and cover connected with a screw thread. The cover houses the pivoting arm and pilot valve and the base includes the inlet and outlet so unscrewing these two parts provides access for cleaning the mating sealing surfaces. A disadvantage of this design, however is that the screw connection is difficult to release without disconnecting the water supply to the valve. Additionally, when the base is removed, the spring, diaphragm and other components are not retained, thereby requiring skill and care to avoid loss of these parts and making reassembly of the valve after maintenance troublesome.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

SUMMARY

According to one aspect of the present invention there is provided a fill valve assembly for controlling liquid flow into a reservoir, including:

a valve body having an outlet opening for directing liquid into the reservoir and an inlet opening;

an adaptor having a liquid inlet passage therein and a valve seating face, the adaptor being configured to be demountably fixed at the inlet opening;

a pressure-responsive member received in the valve body, the pressure-responsive member being movable in response to variations in a control pressure in a control chamber on a first side of the pressure responsive member with which the liquid inlet passage communicates opposite a second side of the pressure responsive member also in communication with the liquid inlet passage, the pressure-responsive member having a valve surface for sealing against the valve seating face of the adaptor to stop flow of liquid from the inlet passage into the outlet opening, and biasing means acting on the pressure-responsive member such that liquid pressure acting on the first side of the pressure-responsive member acts together with the biasing means to force the valve surface toward the valve seating face of the adaptor;

the valve body, pressure-responsive member and biasing means being arranged such that they are demountable from the adaptor as a unit.

The valve body is preferably fixed to the adaptor so as to be readily demountable without tools. The valve body and adaptor may be fixed together in any non-permanent manner, for example, by one or more cooperating screw threads, fasteners, ties, clamps, clips, latches and so forth. Advantageously the adaptor and valve body may be fixed together by a quick connector, such as a hose-type connector and in this manner ready access is provided for maintenance, particularly for cleaning the valve seating face and the mating valve surface.

In the preferred embodiment, to demountably fix the adaptor and valve body, a latch flange is provided on one of the adaptor and the valve body and cooperating latch tabs on the other of adaptor and the valve body, the flange and a mating one of the tabs defining inter-engaging lock surfaces, the lock surfaces being urged toward one another. The latch flange and cooperating tabs may be part of a clamp, latch or like fastener, however the latch flange preferably defines an L-shaped recess of a bayonet joint for receiving each tab to allow the valve body to be connected to the adaptor by a push-twist action. In this manner the fill valve can be readily mounted and demounted, even when the supply of pressurised liquid to the adaptor is maintained. Preferably, the adaptor may be demounted from the valve body by at least partially rotating the valve less than one complete turn, preferably less than a half turn.

With the valve body, pressure-responsive member and biasing means being arranged such that they are demountable from the adaptor as a unit, once the adaptor is separated from this unit, the seating face on the adaptor can be readily accessed (e.g. for cleaning), as can the mating valve surface. Advantageously this demounting operation can be performed without having to take care to capture and avoid the loss of parts of the valve mechanism.

The biasing means preferably includes a spring, most preferably a compression spring retained between the valve body and the pressure-responsive member.

Preferably the pressure-responsive member includes a diaphragm, but it will be appreciated that the pressure-responsive member may take other known forms such as a hinged flap, a piston etc. Preferably however the diaphragm is peripherally fixed to the valve body, and float-operated means is operatively connected to the valve body for varying the control pressure by venting the control chamber. The periphery of the diaphragm is preferably clamped between portions of the valve body, the portions comprising a cover portion which defines the control chamber and a base portion in which the inlet and outlet openings are formed.

Preferably retaining means are provided for retaining the spring and pressure-responsive member together as a unit, the retaining means including:

a retainer for abutting an end of the spring;

a pin having a first end fixed to the retainer, the pin extending through the spring and being received to slide in an aperture in the pressure-responsive member, and a stop for preventing the spring from pulling a second end of the pin through the aperture in the pressure-responsive member.

The valve mechanism preferably further includes a sealing disc fixed to the diaphragm, the valve surface for sealing against the seating face being provided on the sealing disc.

Preferably a is holder fixed to the diaphragm, the holder having a recess in which the sealing disc is mounted and held.

In another aspect the invention comprises valve apparatus adapted to be fixed to an adaptor to provide a valve assembly for controlling liquid flow into a reservoir, the adaptor having a liquid inlet passage therein and a valve seating face, the apparatus including:

a valve body having an outlet opening for directing liquid into the reservoir and an inlet opening, the valve body being configured to be demountably fixed to the adaptor;

a pressure-responsive member received in the valve body, the pressure-responsive member being movable in response to variations in a control pressure in a control chamber on a first side of the pressure responsive member with which the liquid inlet passage communicates opposite a second side of the pressure responsive member also in communication with the liquid inlet passage, the pressure-responsive member having a valve surface for sealing against the valve seating face of the adaptor to stop flow of liquid from the inlet passage into the outlet opening, and biasing means acting on the pressure-responsive member such that liquid pressure acting on the first side of the pressure-responsive member acts together with the biasing means to force the valve surface toward the valve seating face of the adaptor;

the valve body, pressure-responsive member and biasing means being arranged such that they are demountable from the adaptor as a unit, and wherein one of a latch flange and cooperating latch tabs are fixed to the valve body for engagement respectively with latch tabs or a latch flange provided on the adaptor, the flange and a mating one of the tabs defining inter-engaging lock surfaces, the lock surfaces being urged toward one another by the biasing means acting to hold the valve surface against the seating face.

The invention provides a fill valve with an adaptor, which can be readily mounted and demounted in a manner so as to provide for access to the opposing seating faces controlling the operation of the valve. Further, with the valve body, pressure-responsive member and biasing means being arranged such that they are demountable from the adaptor as a unit, unnecessary and difficult reassembly and the possibility of losing parts are avoided.

BRIEF DESCRIPTION OF DRAWINGS

Further aspects of the present invention will become apparent from the following description which is given by way of example only and with reference to the accompanying drawings in which:

FIG. 2 is an exploded view of the fill valve of FIGS. 1a and 1b;

FIG. 3 is an orthogonal side view of the adaptor of the fill valve of FIGS. 1a and 1b;

DETAILED DESCRIPTION

Figure 1A:
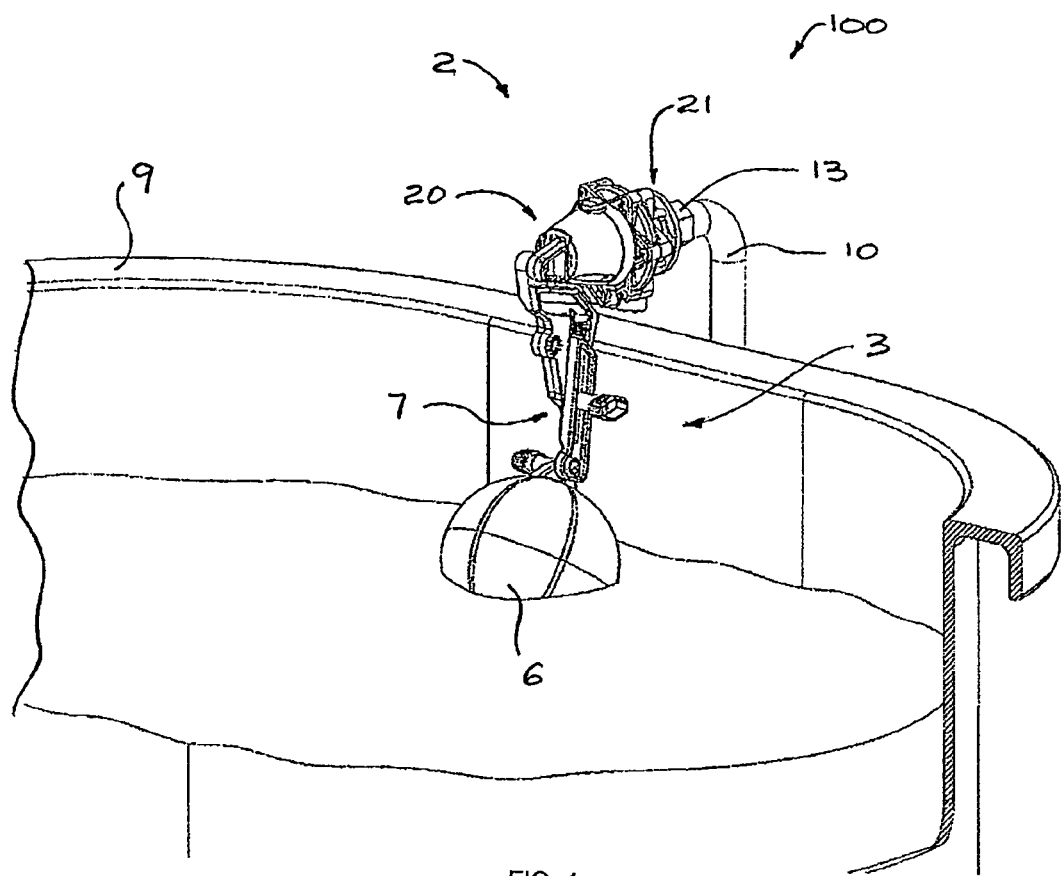
FIGS. 1a and 1b are pictorial views of a fill valve assembly of the present invention mounted and demounted respectively.

Referring to the drawings, there is illustrated a fill valve assembly 100 embodying the features of the present invention. The fill valve assembly 100 controls the flow of water into a livestock watering trough 9 to maintains the level of water in at a pre-selected level, refilling the trough 9 to the pre-selected level after the level is lowered. In general, the assembly 100 includes mounting adaptor 1, a valve apparatus 2 and a float assembly 3. The float assembly 3 comprises a control lever 7, one end of which is attached to the valve apparatus 2 and the other to the float 6.

Figure 1B:
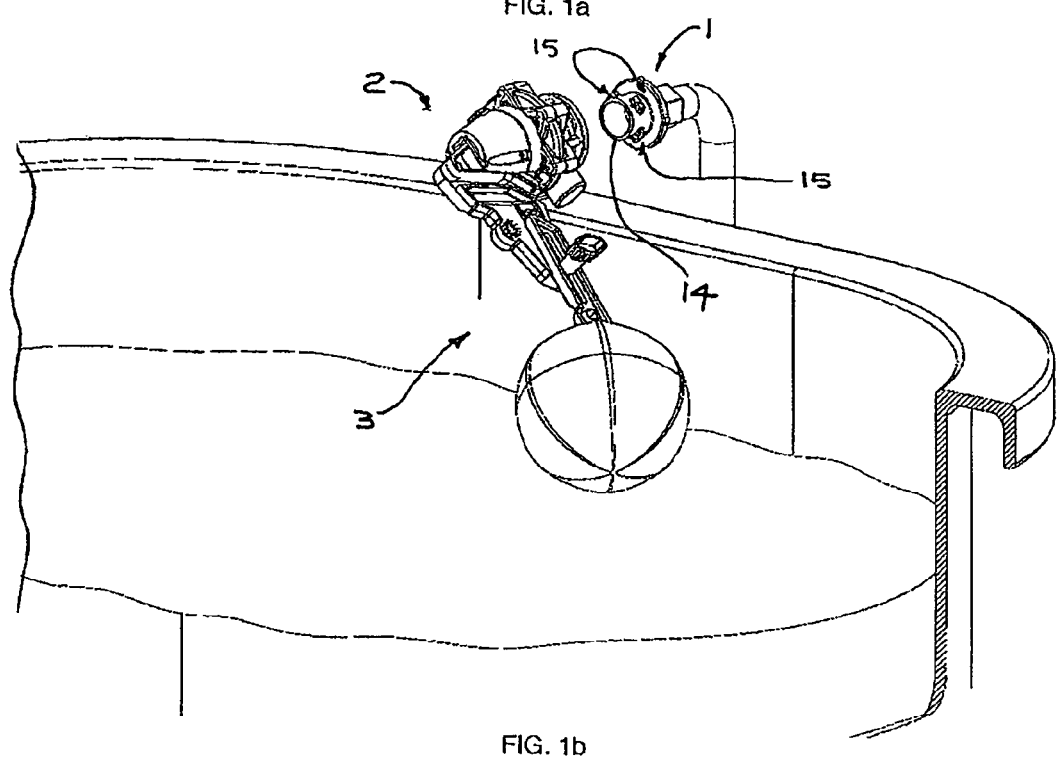
Figure 4:
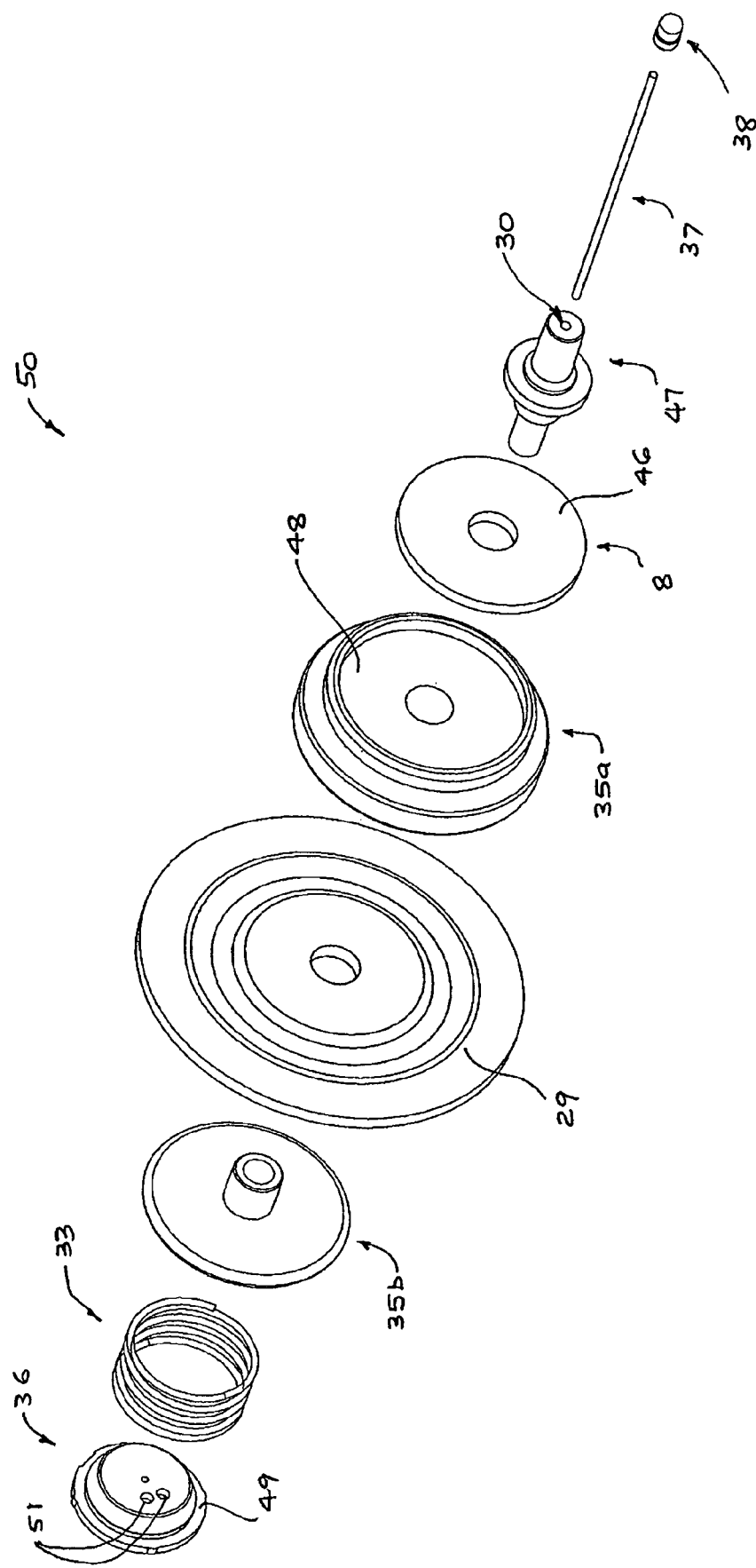
FIG. 4 is an exploded view of the diaphragm assembly of the fill valve of FIGS. 1a and 1b.

FIG. 1a illustrates the fill valve assembly 100 connected by the mounting adaptor 1 to a water riser 10 in use. In the position shown, the buoyancy of the ball-shaped float 6 acts to close the valve apparatus 2 to stop water from the riser 10 flowing into the trough 9. FIG. 1b illustrates the manner in which the valve apparatus 2 (and the attached float assembly 3) may be readily demounted from the mounting adaptor 1 as a unit by the twist-pull action of a bayonet coupling (as described in greater detail below) to expose the annular valve seating face 14. When demounted ready access is provided for cleaning the valve seating face 14 and the mating valve surface.

The valve apparatus 2 comprises a two-part valve body including the cover 20 and base 21 (shown separated in FIG. 2) which are joined together by fasteners (not shown) to enclose a valve mechanism. In the cover 20 is an inlet opening 40 and an outlet opening 5 for directing water into the trough. The control lever 7 of the float assembly 3 is connected to the base 21 by a pivot 41.

The adaptor 1 has external screw threads 12 for mating with a threaded fitting 13 (FIGS. 1a, 1b) by which it is fixed to the riser 10. Water is supplied from the riser 10 to the valve apparatus 2 through an axially-extending inlet passage 4 in the adaptor 1. The annular seating face 14 is formed at the end of a cylindrical section 16 on which four equally angularly spaced latch tabs 15 are formed, projecting generally radially outward. An integrally formed radially extending rim 17 separates the cylindrical portion 16 and threaded portion 12.

The opening 40 is formed in a latch flange 18 of the base 21 and is sized to receive the cylindrical portion of the adaptor 1. The latch flange 18 includes four equally angularly spaced L-shaped recesses 42, one receiving each of the latch tabs 15. Each recess 42 has an axially extending portion 25 into which the tabs 15 are pushed, before a turning movement rotates each tab 15 along the circumferentially extending portion 26. Each circumferentially extending portion 26 has an inner face cam face 43 which is inclined axially. The adaptor 1 is pushed into the base 21 and turned clockwise, each abutment 27 serving to limit further clockwise rotation, as well as engaging the adjacent tab 15 to bound an edge of the L-shaped recess. Anticlockwise rotation is resisted by one of four protrusions 38 extending radially out from the rim 17. The protrusions 38 engage with respective nubs 39 on the resilient gasket 28.

During the turning movement the latch tabs 15 slide over the inner face cam face 43 which serves to compress the gasket 28 between the rim 17 and the latch flange 18, taking up clearance between the components to provide a more rigid connection. When the adaptor 1 is fixed by this bayonet joint, the lock surface 29a of each latching tab 15 inter-engages with a corresponding lock surface 29b of the latch flange. The locking faces 29a, 29b extend generally radially and resist the axial force applied to the annular seating face 14.

Figure 5:
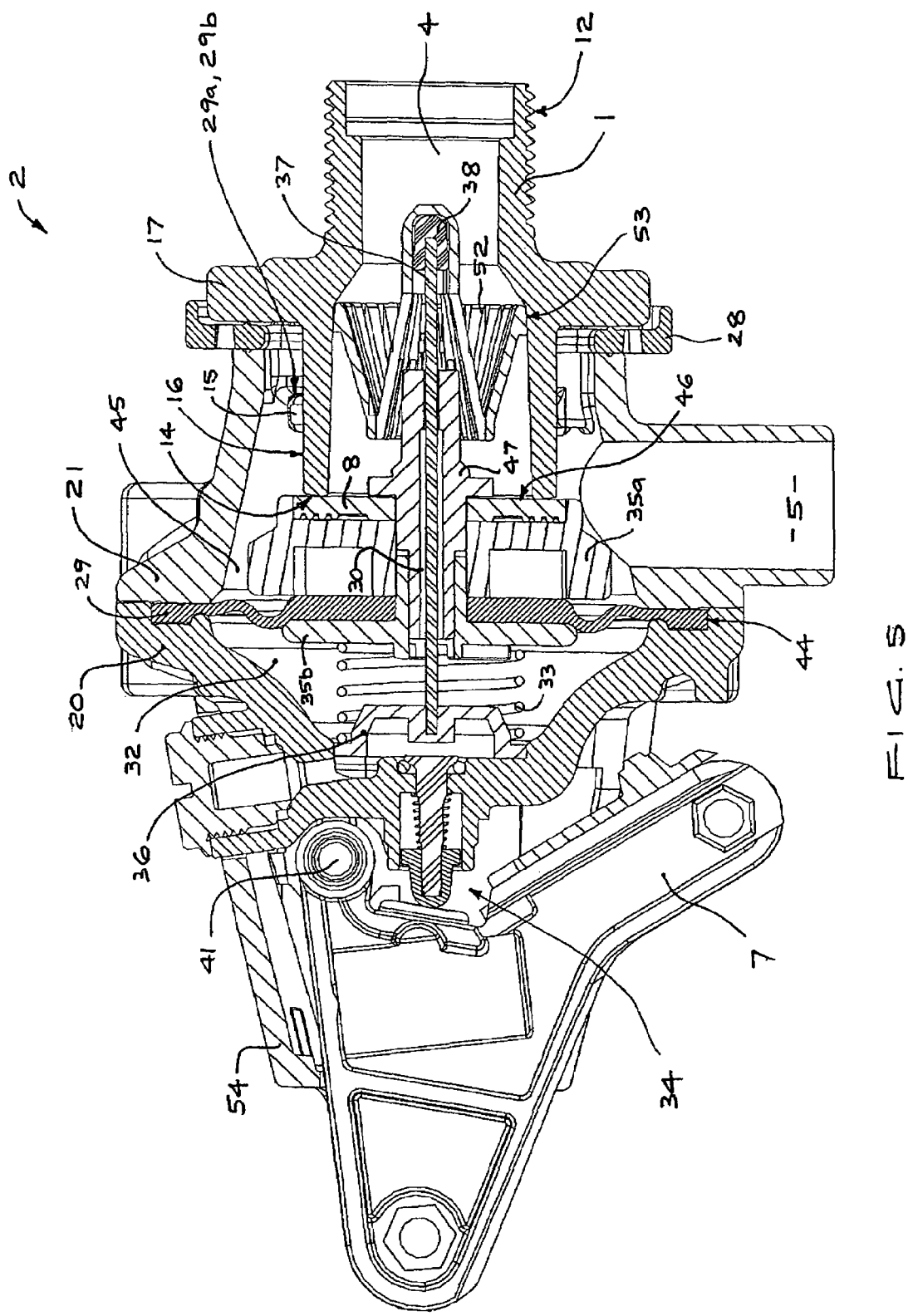
FIG. 5 is a sectional view through the fill valve of FIGS. 1a and 1b.

The valve mechanism includes a pressure-responsive member in the form of diaphragm 29, the periphery 44 of which is clamped between the cover 20 and the base 21. The volume bounded between a first side of the diaphragm 29 and the cover 20 forms a control chamber 32 (FIG. 5). On the opposite side of the diaphragm 29, between the second side of the diaphragm 29 and the base 21 is an outlet chamber 45. The central section of the diaphragm 29 is clamped between holder 35a (received in the outlet chamber 45) and holder 35b (received in the control chamber 32). Received in a recess 48 in the holder 35a is valve disc 8 having an annular valve surface 46 for sealing against the valve seating face 14 of the adaptor 1 to stop flow from the inlet passage 4 into the outlet chamber 45 and on through the outlet 5. A stem 47 extends axially though the holders 35a, 35b, diaphragm 29 and valve disc 8 and it includes a central port 30 (FIG. 5) for liquid communication between the control chamber 32 and the inlet passage 4. The diaphragm assembly 50, including the stem 47, the holders 35a, 35b and the valve disc 8 are permanently connected (e.g. by press fits, or the like) to move together with the central part of the diaphragm 29 in response to variations in control pressure in the control chamber 32. A normally-closed pilot valve 34 is mounted in the control chamber 32 for engagement with the pivoting arm 7.

Biasing means in the form of a compression spring 33 is received in the control chamber 32 and retained between the cover 20 and the diaphragm 29. The spring 33 bears against the holder 35b thereby forcing the attached valve disc 8 to its closed position where it engages the valve seating face 14, preventing water flowing to the outlet 5.

A retainer 36, a pin 37 and a stop 38 cooperate for retaining the spring 33 and diaphragm assembly together as a unit. The pin 37 is received to slide in the port 30 and is fixed at one end to the retainer 36 which has an annular face 49 for abutting an end of the spring 33. The stop 38 is fixed (e.g. by a press fit) to the second end of the pin 37, thereby preventing the spring 33 from pulling a second end of the pin 37 through the port aperture 30.

The valve assembly 2 also includes a strainer 52 the centre of which is received over the end of the stem 47 and fixed by a press fit to the stop 38. The strainer 52 is received in the adaptor 1 and a cylindrical outer face 53 engages a corresponding inner face of the inlet passage 4 constraining all inlet water to pass through the strainer 52. A cap 54 is fixed by fasteners to the cover 20 and includes a slot 55 in which the pivoting arm 7 is received.

When the valve disc 8 is in its closed position (shown in FIG. 5), static water pressure acting on both sides of the diaphragm 29 is the same. The compression spring 33 biases the valve disc 8 axially against the seating face 14 to its closed position. When the float 6 falls, the pivoting arm 7 connected thereto opens the pilot valve 34 which vents the control chamber 32 (the water passing through offset openings 51 in the retainer 36), such that the pressure on the inlet side overcomes the spring bias and moves the valve disc 8 to its open position. Water then flows from the inlet adaptor 1, radially out across the seating face 14 and downward through the outlet 5 into the trough 9.

The use of the fill valve assembly 100 is best understood with reference to FIGS. 1a and 1b. The assembly 100 is mounted by the adaptor 1 through which water is supplied from the riser 10, with the control lever 7 upright. The valve apparatus 2 and float assembly 3 can thus be demounted readily by a simple twist-and-pull movement from the adaptor 1, without any additional disassembly or the necessity to stop water supply to the riser 10.

Aspects of the present invention have been described by way of example only and it should be appreciated that modifications and additions may be made thereto without departing from the scope thereof.

What is claimed is:

1. A fill valve assembly for controlling liquid flow into a reservoir, comprising:
   a valve body having an outlet opening for directing liquid into the reservoir and an inlet opening;

an adaptor having a liquid inlet passage therein and a valve seating face, the adaptor being configured to be demountably fixed at the inlet opening;

a pressure-responsive member received in the valve body, the pressure-responsive member being movable in response to variations in a control pressure in a control chamber on a first side of the pressure responsive member with which the liquid inlet passage communicates opposite a second side of the pressure responsive member also in communication with the liquid inlet passage, the pressure-responsive member having a valve surface for sealing against the valve seating face of the adaptor to stop flow of liquid from the inlet passage into the outlet opening;

biasing means acting on the pressure-responsive member such that liquid pressure acting on the first side of the pressure-responsive member acts together with the biasing means to force the valve surface toward the valve seating face of the adaptor; and retaining means for retaining the biasing means and pressure-responsive member together as a unit, the retaining means including: a retainer for abutting an end of the biasing means, a pin having a first end fixed to the retainer, the pin extending through the biasing means and being received to slide in an aperture in the pressure-responsive member, and a stop for preventing the biasing means from pulling a second end of the pin through the aperture in the pressure-responsive member;

wherein the valve body, the pressure-responsive member, and the biasing means are arranged such that they are demountable from the adaptor as a unit.

2. The valve assembly of claim 1 wherein the biasing means includes a compression spring retained between the valve body and the pressure-responsive member.

3. The valve assembly of claim 2 wherein the pressure-responsive member includes: a diaphragm peripherally fixed to the valve body, and float-operated means operatively connected to the valve body for varying the control pressure by venting the control chamber.

4. The valve assembly of claim 3 wherein the periphery of the diaphragm is clamped between portions of the valve body, the portions comprising a cover portion which defines the control chamber and a base portion in which the inlet and outlet openings are formed.

5. The valve assembly of claim 3 further including a sealing disc fixed to the diaphragm, the valve surface for sealing against the seating face being provided on the sealing disc.

6. The valve assembly of claim 1 wherein a latch flange is provided on one of the adaptor and the valve body and cooperating latch tabs on the other of adaptor and the valve body, the latch flange and a mating one of the latch tabs defining inter-engaging lock surfaces, the lock surfaces being urged toward one another by the biasing means.

7. The valve assembly of claim 6 wherein the latch flange defines an L-shaped recess of a bayonet joint for receiving each tab to allow the valve body to be connected to the adaptor by a push-twist action.

8. Valve apparatus adapted to be fixed to an adaptor to provide a valve assembly for controlling liquid flow into a reservoir, the adaptor having a liquid inlet passage therein and a valve seating face, the apparatus including:

a valve body having an outlet opening for directing liquid into the reservoir and an inlet opening, the valve body being configured to be demountably fixed to the adaptor;

a pressure-responsive member received in the valve body, the pressure-responsive member being movable in response to variations in a control pressure in a control chamber on a first side of the pressure responsive member with which the liquid inlet passage communicates opposite a second side of the pressure responsive member also in communication with the liquid inlet passage, the pressure-responsive member having a valve surface for sealing against the valve seating face of the adaptor to stop flow of liquid from the inlet passage into the outlet opening;

biasing means acting on the pressure-responsive member such that liquid pressure acting on the first side of the pressure-responsive member acts together with the biasing means to force the valve surface toward the valve seating face of the adaptor; and retaining means for retaining the biasing means and pressure-responsive member together as a unit, the retaining means including: a retainer for abutting an end of the biasing means, a pin having a first end fixed to the retainer, the pin extending through the biasing means and being received to slide in an aperture in the pressure-responsive member, and a stop for preventing the biasing means from pulling a second end of the pin through the aperture in the pressure-responsive member;

wherein the valve body, the pressure-responsive member, and the biasing means are arranged such that they are demountable from the adaptor as a unit, and wherein one of a latch flange and cooperating latch tabs are fixed to the valve body for engagement respectively with latch tabs or a latch flange provided on the adaptor, the flange and a mating one of the tabs defining inter-engaging lock surfaces, the lock surfaces being urged toward one another by the biasing means acting to hold the valve surface against the seating face.

\* \* \* \* \*

UNITED STATES PATENT AND TRADEMARK OFFICE
CERTIFICATE OF CORRECTION

PATENT NO. : 7,647,938 B2
APPLICATION NO. : 11/259359
DATED : January 19, 2010
INVENTOR(S) : Jobe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1031 days.

Signed and Sealed this

Twenty-eighth Day of December, 2010

David J. Kappos
*Director of the United States Patent and Trademark Office*